Figure 1:
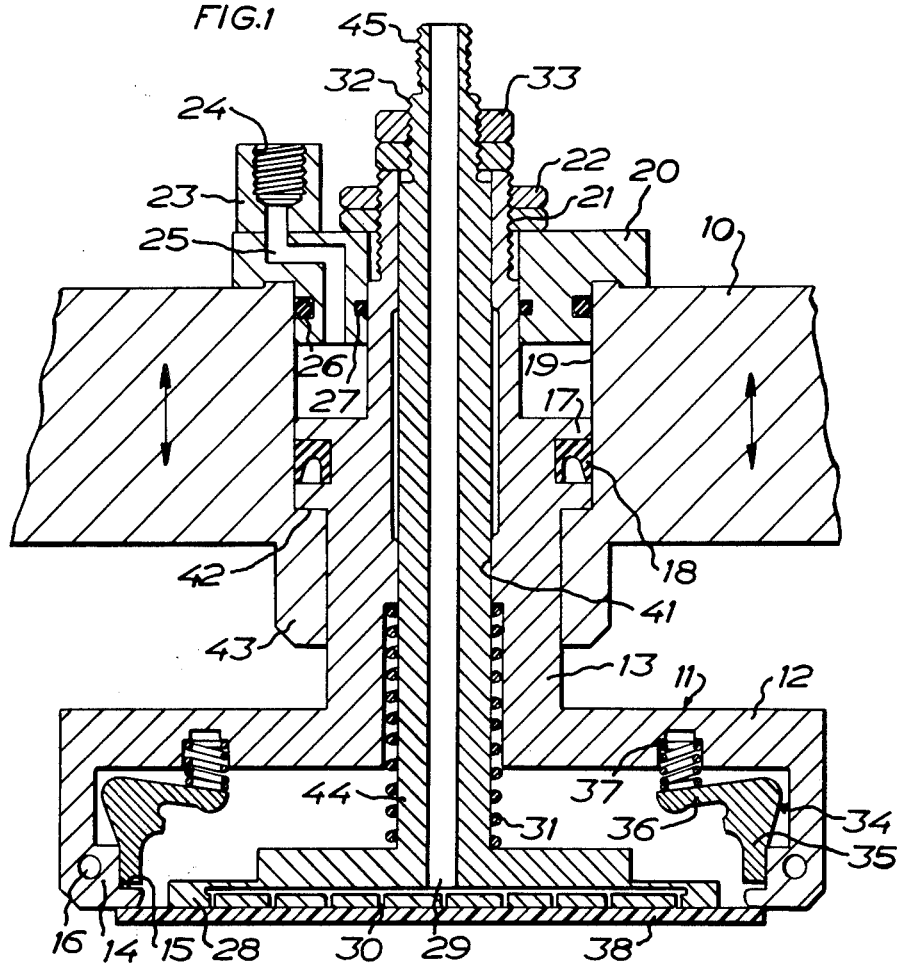

United States Patent [19]

Sollerud

[11] 4,005,975
[45] Feb. 1, 1977

[54] APPARATUS FOR CONNECTING TOGETHER PARTS OF FOAM PLASTICS

[75] Inventor: Sören Elof Mauritz Sollerud, Norrkoping, Sweden

[73] Assignee: Tetra Pak Developpement SA, Lausanne, Switzerland

[22] Filed: Oct. 3, 1975

[21] Appl. No.: 619,433

Related U.S. Application Data

[62] Division of Ser. No. 422,812, Dec. 7, 1973, abandoned.

[30] Foreign Application Priority Data

Dec. 8, 1972 Sweden .................... 16017/72

[52] U.S. Cl. ................ 425/500; 425/501; 425/508; 425/520
[51] Int. Cl.² ............... B29C 23/00; B29D 27/00; B29D 9/00
[58] Field of Search .......... 425/500, 501, 506, 507, 425/508, 520

[56] References Cited

UNITED STATES PATENTS

| | | | |
|---|---|---|---|
| 3,466,214 | 9/1969 | Polk et al. | 425/508 X |
| 3,668,031 | 6/1972 | Bast | 425/500 X |
| 3,695,806 | 10/1972 | Arfert | 425/520 X |
| 3,879,245 | 4/1975 | Fetherston et al. | 425/507 |

*Primary Examiner*—J. Howard Flint, Jr.
*Attorney, Agent, or Firm*—Beveridge, DeGrandi, Kline & Lunsford

[57] ABSTRACT

Two parts of foam plastics are connected together by heating a portion of the first part so that it will melt, while the corresponding portion of the second part is kept at a considerably lower temperature, preferably room or ambient temperature. After the heating of the first portion the parts are immediately brought together, whereby a surface layer of the second part rapidly melts, whereupon the second part serves as a heat dissipating means to provide a rapid hardening of the molten portions. After the two parts have been put together, a pressure applying means can be pressed against the joint formed between the parts.

9 Claims, 3 Drawing Figures

APPARATUS FOR CONNECTING TOGETHER PARTS OF FOAM PLASTICS

This is a division of application Ser. No. 422,812 filed Dec. 7, 1973, now abandoned.

This invention relates to an apparatus for tightly connecting together two parts of foam plastics.

West German Patent No. 2,105,966 discloses a method of welding together two parts of foam plastics. In this prior-art method the two parts are heated along the surfaces to be joined until a predetermined amount of molten material has been obtained, and then the molten portions are brought into contact with one another and possibly subjected to pressure. This method has many advantages but also some disadvantages. In fact, when the method is utilized for the manufacture of packagings, the joint between the parts is exposed toward the interior of the packaging, for which reason polymers released at the melting can collect in the packaging above the product therein, producing a deterioration of the taste and/or odour of the product, particularly if the product is a foodstuff of milk or flour content. Moreover, rather complicated, exactly operating machines are required for realizing this welding method, and such machines are expensive in manufacture and maintenance.

The object of the present invention is to provide an apparatus for connecting together parts of foam plastics which, when utilized for the manufacture of packagings, does not involve any risk that molten material will become exposed toward the interior of the packaging.

A further object is to provide the connection in such a manner that it can be realized by considerably simpler and thus more reliable machines than hitherto.

According to the invention, the apparatus for tightly connecting together two parts of foam plastics comprises structure for heating a portion of the first part by means of heating jaws or like means so that it will melt, while the other part is maintained at a considerably lower temperature, preferably room or ambient temperature, and then immediately joining the parts, whereby that surface portion of the second part which is brought into contact with the molten portion of the first part rapidly melts, whereupon the second part functions as heat dissipating means to provide rapid hardening of the molten portions.

The apparatus comprises one holder for each part to be connected together, heating jaws movable between a position of rest and a position in contact with the first part to melt a portion thereof while the second part is kept spaced therefrom and maintained at a considerably lower temperature, preferably room or ambient temperature, and the holders are relatively movable to permit rapidly bringing the parts into contact with one another after the melting of said portion of the first part.

Figure 2:
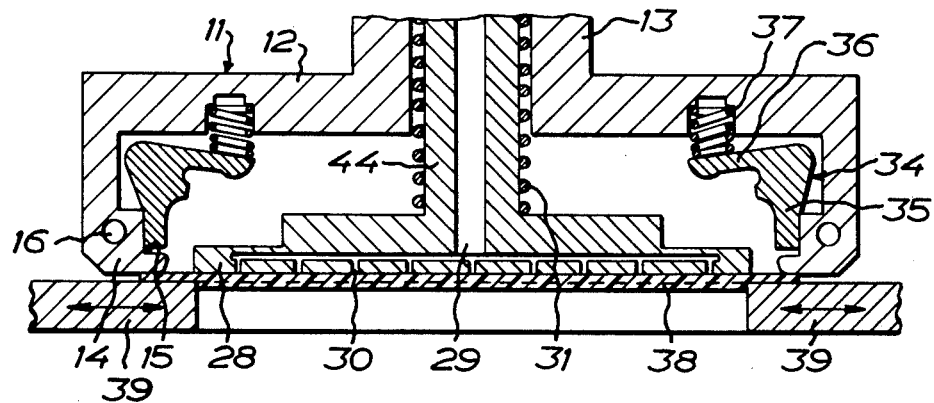
Figure 3:
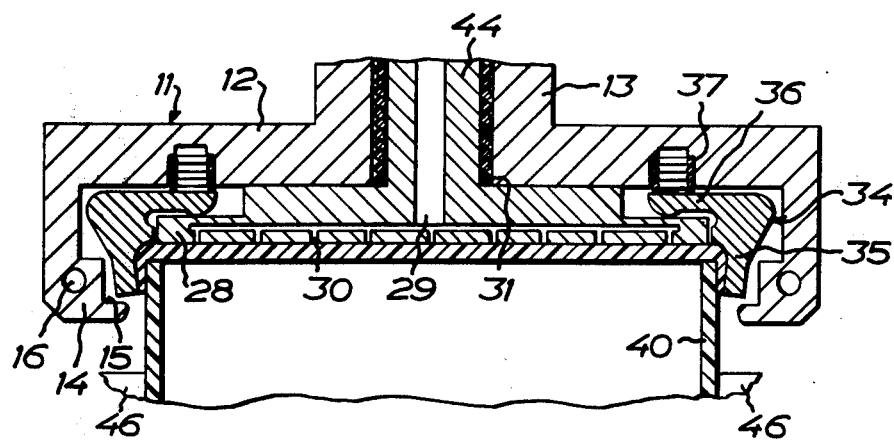

The invention will be more fully described hereinbelow by way of example and with reference to the accompanying drawings in which:

FIGS. 1 to 3 show vertical sections of part of a machine for connecting together two parts of foam plastics, in three different operative positions.

The part illustrated in the drawing is but a small section of a machine for carrying the method according to the invention into effect, but since the other parts of the machine can be constructed in any conventional manner whatever, they have been omitted in order not to make the description unnecessarily complex.

The apparatus illustrated comprises a mould 11, which is movably attached to a vertically reciprocable machine element 10. The mould 11, in which there shall be retained a part 38 of foam plastics to be connected together with another part 40 of foam plastics, which is retained by a holder (not shown), consists of an inverted cup-shaped means 12 which is rectangular in horizontal section and which around the edge defining the cup opening has a shoulder 14 with an annular recess 15 facing inwardly toward the bottom of the cup. A channel 16 for coolant is arranged in the shoulder 14 and extends around the opening of the cup-shaped means 12. A central stem 13 extends in an upward direction from the upper side of the cup-shaped means 12. The stem is of circular cross-section and has a central through channel 41 which also extends through the bottom of the cup-shaped means 12. At some distance from the cup-shaped means 12 the stem 13 has an annular widened portion 17 which is provided with an annular recess accommodating a packing 18 the function of which will be explained in the following. The stem 13 having the annular portion 17 is movable in a bore 19 formed in the machine element 10, said bore having the same diameter as the portion 17 of the stem 13 but tapering downward so that a shoulder 42 is formed, which the annular portion 17 abuts to limit the downward movement of the cup-shaped means 12 relative to the machine element 10. The machine element 10 has as its downwardly facing side around the opening 19 a downwardly directed collar 43 which limits the upward movement of the cup-shaped means 12. The bore 19 is limited at the upper end by a plug member 20 which projects into the bore and has a central opening accommodating that part of the stem 13 which extends upwardly from the widened portion 17. This upwardly extending part has a threaded (21) upper end, and nuts 22 are screwed on the threaded end into engagement with the upper side of the plug member 20. A socket 23 having a threaded bore 24 therein is secured to the upper side of the plug member 20. The threaded bore 24 communicates with a space between the plug member 20 and the upper side of the annular portion 17 of the stem 13 in the bore 19 through a channel 25 extending through the plug member 20. Said space can be brought into communication with a source of compressed air via the socket 23, the threaded bore 24 and the channel 25. To seal the space between the plug member 20 and the annular portion 17, gaskets 26, 27, for example O-rings, are placed around a part of the plug member 20 which projects into the bore 19, and around the central bore of the plug member 20, through which bore the stem 13 extends. The mould 11 with the cup-shaped means 12 and the stem 13 can thus move between a lower position shown in FIG. 1, in which the underside of the annular portion 17 engages the shoulder 42, and an upper position in which the upwardly facing surface of the cup-shaped means 12 engages the downwardly facing surface of the collar 43.

In the cup-shaped means 12 a suction plate 28 is secured to a stem 44 which extends through the central bore 41 of the stem 13 upwardly through the plug member 20. The bore 41 has a constriction at a distance from its lower end, and a pressure spring 31 is mounted between said constriction and the upper side of the suction plate 28. The stem 44 at its upper end has a thread 32 onto which two nuts 33 are screwed into engagement with the upper end of the stem 13. It will be realized that it is possible to adjust the height of the suction plate 28 in the cup-shaped means 12 with the aid of the nuts 33. The suction plate has a central channel 29 which at the downwardly facing surface of the plate branches into a number of channels or openings 30 which open into said surface. Suction is produced in that the channel 29 is connected to a source of vacuum by means of a threaded connection 45 at the upper end of the stem 44. The suction plate 28 can move between a lower position at or beneath the lower edge of the means 12 and an upper position in which the upper side of the plate is in contact with the bottom of the means 12. The movement of the suction plate takes place against the action of the spring 31.

A clamping device 34 is mounted around the inner periphery of the cup-shaped means 12. The device 34 comprises a number of profile elements, and each profile element has a downwardly directed flange 35, part of which lies in the recess 15, and a flange directed toward the interior of the cup 12. The flange 35 is meant to be moved inwardly toward the interior of the cup, which is realized in that the flange 36 serving as an actuating lever, is moved upwardly against the action of a spring 37. The upward movement is realized by means of the rear face of the suction plate 28, as wil appear more fully from the following.

The apparatus described above is utilized in the following manner for connecting together two parts of foam plastics. These parts comprise, for example, a tubular body member 40 and a closure panel member 38 which is to be placed on the body member after the product has been filled thereinto. The closure panel member 38 is first placed on the suction plate 28, which preferably takes place automatically. As will appear from the drawing, the closure panel member is larger than the opening in the cup-shaped means 12, for which reason the edges of the closure panel member will bear against the downwardly facing boundary surface of the means 12, in case the lower face of the suction plate is on a level with said boundary surface. After the closure panel member 38 has been placed in this position, heating jaws 39 are moved inwardly and brought into contact with the edge portions of the closure panel member 38, whereby a predetermined amount of closure panel material along said portions is caused to melt. The body member 40 is retained beneath the cup-shaped means with its axis coinciding with the axis of the suction plate 28 and at such a distance therefrom that no heating of the body member material takes place. Thus, the body member material is kept at ambient or room temperature. After a satisfactory amount of molten material has been obtained along the edges of the closure panel member, the heating jaws 39 are removed and the machine element 10 is lowered. After the machine element has been lowered a certain distance, the underside of the closure panel member will engage the upwardly facing edge of the body member 40. At the continued downward movement, the downwardly facing boundary surface of the cup-shaped means 12 will be passed down onto the upper end portion of the body member 40 at the same time as the suction plate 28 is urged into the cup-shaped means against the action of the spring 31. It may sometimes be desirable slightly to impede this movement of the cup-shaped means 12 and in such a case the space between the annular portion 17 and the plug member 20 is supplied with compressed air. By this supply of compressed air, which may be variable during the operating cycle, a spring action is obtained so that a maximum pressure force can be obtained in relation to the compressive strength of the plastics material. When the suction plate 28 moves into the cup-shaped means against the action of the spring 31, the edges of the closure panel member 38 by reason of their engagement with the downwardly facing boundary surface of the cup-shaped means will be bent downwardly and inwardly toward the upper edge portion of the body member. When the suction plate 28 has moved a certain distance into the cup-shaped means 12, its rear face will abut the actuating flange 36 of the clamping profile elements which are thereby tilted so that the flange 35 of the profile elements will move inwardly toward the interior of the cup-shaped means and will there meet the edge portions of the cover which have now been bent downwards over the body member, pressing said edge portions into the extreme position (shown in FIG. 3) against the outer side of the body member. The molten closure panel material will thus come into contact with the cool body member material, so that first that surface of the body member material which comes into contact with the molten material of the closure panel member will rapidly melt, and then rapid hardening will take place by heat dissipation, on the one hand, via the body member 40 and, on the other hand, because of the clamping profile elements which are relatively cool, considering that in their position of rest they lie close to the coolant channel 16. The molten edge portions are thus brought into engagement with the outer side of the body member and therefore no molten material can penetrate into the container thus produced.

The apparatus illustrated in the drawings is adapted to close a rectangular packaging and for this reason, of course, two further clamping devices 34 in addition to those illustrated are arranged at right angles to the latter. Apart from these devices, preferably stationary shaping means for the corners of the packaging are provided in the means 12. When the closure panel member 38 and the upper end of the body member penetrate into the cup-shaped means 12 they will abut said shaping means. These stationary shaping means realize an additional upsetting, often found necessary, of the corners of the packaging.

What I claim and desire to secure by Letters Patent is:

1. An apparatus for connecting together first and second parts of foam plastics, comprising
   a. a first holder means for the first part,
   b. heating means movable relative to the first holder means from a retracted position to an active position where it applies heat against a surface of a first part in the first holder means to melt a portion thereof,
   c. a second holder means for holding the second part at a position opposed to the first holder means when heat is being applied to the first part,
   d. said first and second holder means being relatively movable between first and second positions, said first position being one in which a second part in the second holder means is so spaced from a first part in the first holder means as not to be influenced by the heat from the heating means when at its said active position, said second position being one in which the molten portion of the first part is engaged with the non-heated portion of the second part.

2. An apparatus as claimed in claim 1, including pressure applying means for pressing against the joint between the two parts after these have been put together.

3. An apparatus for closing a container of foam plastics with a closure panel of the same material, comprising
   a. a container holder means for holding the container,
   a cup shaped means,
   c. a closure holder means for holding a closure panel between the cup shaped means and a container on said container holder means, said closure holder means being movable relative to the cup shaped means from a first position where a closure panel thereon is located outside the cup shaped means to a second position where a closure panel thereon is within the cup shaped means,
   d. heating means movable between a rest position and an active position where it is operable against a peripheral portion of the closure which faces a container in the container holder means, said heating means when in its active position being spaced from the container holder means a distance so that the container is not influenced by heat from the heating means, and
   e. means for moving the holder means relative to each other upon movement of the heating means to its rest position to bring the molten portion of the closure panel member against the container and to move the closure holder means from its first position to its second position whereupon said cup shaped member presses the peripheral portion of the closure against the outer wall of the container.

4. An apparatus as claimed in claim 3 wherein the closure holder means is a suction plate.

5. An apparatus as claimed in claim 3 wherein the heating means comprises heating jaws which contact the closure panel.

6. An apparatus as claimed in claim 5 wherein said heating jaws are movable in a path which is perpendicular to the relative movement between the holder means.

7. An apparatus as claimed in claim 3, wherein said cup shaped means includes a plurality of peripherally-arranged pressure applying members which are movable approximately at right angles to the relative movement between the holder means.

8. An apparatus as claimed in claim 7, in which the pressure applying members comprise at least two tiltable profile elements each of which is mounted along its one longitudinal edge and has actuating means extending from said edge and protruding into the path of motion of the closure holder means, said closure holder means being operable to engage said actuating means to tilt the profile elements against the outer circumferential surface of the container when the closure holder means has been moved a predetermined distance into the cup-shaped means.

9. An apparatus as claimed in claim 8 wherein the closure holder means is a suction plate, and the heating means comprises heating jaws which contact the closure panel.

* * * * *